US 6,629,225 B2

(12) United States Patent
Zumkehr

(10) Patent No.: US 6,629,225 B2
(45) Date of Patent: Sep. 30, 2003

(54) METHOD AND APPARATUS FOR CONTROL CALIBRATION OF MULTIPLE MEMORY MODULES WITHIN A MEMORY CHANNEL

(75) Inventor: John F. Zumkehr, Orange, CA (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 09/872,179

(22) Filed: May 31, 2001

(65) Prior Publication Data

US 2002/0184461 A1 Dec. 5, 2002

(51) Int. Cl.$^7$ .............................................. G06F 13/00
(52) U.S. Cl. ............................ 711/167; 711/5; 711/154
(58) Field of Search ............................ 711/5, 154, 167

(56) References Cited

U.S. PATENT DOCUMENTS 6,418,068 B1 * 7/2002 Raynham ..................... 365/200
6,442,644 B1 * 8/2002 Gustavson et al. ......... 711/105
6,446,158 B1 * 9/2002 Karabatsos .................... 711/5
2002/0173926 A1 * 11/2002 McCord ....................... 702/120

* cited by examiner

*Primary Examiner*—Reba I. Elmore
(74) *Attorney, Agent, or Firm*—Blakely, Sokoloff, Taylor & Zafman LLP

(57) ABSTRACT

A method and apparatus for control calibration of multiple memory modules within a memory channel is described. The method selects a memory channel from one or more memory channels coupled to a controller. Next, a memory module, coupled to the memory channel, is selected. A path delay is then determined for the selected memory module. The path delay includes a time interval for receipt of a data signal following issuance of a command by the controller to the selected memory module. Once determined, the path delay is stored, such that when the controller issues a command to a selected memory module, a controller receiver is enabled to capture a data signal following a time interval, as defined by the path delay, from issuance of the command. This process is repeated until a path delay is determined for each memory module of each memory channel coupled to the controller.

27 Claims, 12 Drawing Sheets

| UNCERTAINITY SOURCES | ERROR(PS) |
|---|---|
| JEDEC SPECIFICATION (tDQSCK) | 1600 |
| DIMM CLOCK ERROR | 100 |
| BOARD CHANNEL DIFFERENCES | 500 |
| WORST CASE DELAY DUE TO SEW RATE DIFFERENCES | 200 |
| BOARD SKEW | 550 |
| MRHD DIE & PACKAGE DIFFERENCES | 50 |
| TOTAL STROBE VARIATION | 3000 |

METHOD AND APPARATUS FOR CONTROL CALIBRATION OF MULTIPLE MEMORY MODULES WITHIN A MEMORY CHANNEL

FIELD OF THE INVENTION

The present invention relates generally to a digital solid state memories. In particular, the present invention relates to a method and apparatus for control calibration of multiple memory modules within a memory channel.

BACKGROUND OF THE INVENTION

In a memory subsystem that operates in a source synchronous manner, the device which transmits a data signal on a conductive data line also transmits a strobe signal on a separate conductive line. A pulse in the strobe signal has a predefined phase relationship to each associated pulse in a number of data signals. The pulse in the strobe signal is used to capture bit values in the data signals at the receiving device. This is done by running the data and strobe signals through receiver circuitry which detects the logic levels that are being asserted, and translates them into voltage levels that are suitable for processing by controller circuitry in an integrated circuit (IC) die. The outputs of the receiver circuitry are then fed to a number of latches each of which captures a bit value in a respective data signal in response to a pulse in the strobe signal.

According to certain high speed signaling requirements, the strobe receiver circuit at its front end should have a two input comparator, where each input is terminated at the same termination voltage, which may be half-way between a logic '0' voltage and a logic '1' voltage. The strobe line coming from the memory device is shorted to one of the inputs. The comparator's output at any time indicates the logic state being detected on the strobe line, as either '0' or '1' depending upon whether the strobe signal is being asserted or deasserted by the memory device. The output of the comparator directly feeds the clock input of a latch. A data input of the latch receives a level-translated version of the data signal. The latch thus captures a bit value in the data signal upon every low/high to high/low transition of the comparator output. In other words, the latched bit values are always dictated by the strobe signal. The latter is also referred to here as 'continuously forwarding' the strobe signal.

In some high speed memory specifications such as double data rate (DDR) synchronous dynamic random access memory (SDRAM), as defined by the Joint Electronic Device Engineering Council (JEDEC) Solid State Technology Association in their publication, *DDR SDRAM Specification (JESD79)*, June 2000, a memory device must neither assert or deassert a strobe signal (DQS) 102 when it is not providing any data (DQ) 104 in response to a read command as illustrated by the timing diagram 100, as depicted in FIG. 1. However, the DQS signal 102 is driven to a known state, prior to being asserted, for a predetermined time interval referred to as a preamble 106. In addition, the DQS signal 102 is driven to a known state, following a final deassertion, for a predetermined period referred to as the postamble 108. In other words, when no read data DQ 104 is being transferred, the memory device should not drive the DQS signal 102 to a '0' or '1' voltage. This, however, causes a problem at the receiving device when the strobe line DQS 102 floats to the termination voltage, thereby causing the comparator output to become unstable due to the now essentially equal input voltages. This instability in turn will cause the unacceptable result that unintended bit values are captured by the latch from the data line DQ 102. In addition, the DQS signal 102 needs to be delayed, by a predetermined period 112, to a center of the data valid window 114, as illustrated by the delayed DQS signal 110.

Therefore, there remains a need to overcome one or more of the limitations in the above-described, existing art.

BRIEF DESCRIPTION OF THE DRAWINGS

The features, aspects, and advantages of the present invention will become more fully apparent from the following Detailed Description and appended claims when taken in conjunction with accompanying drawings in which:

DETAILED DESCRIPTION OF THE INVENTION

Figure 1:
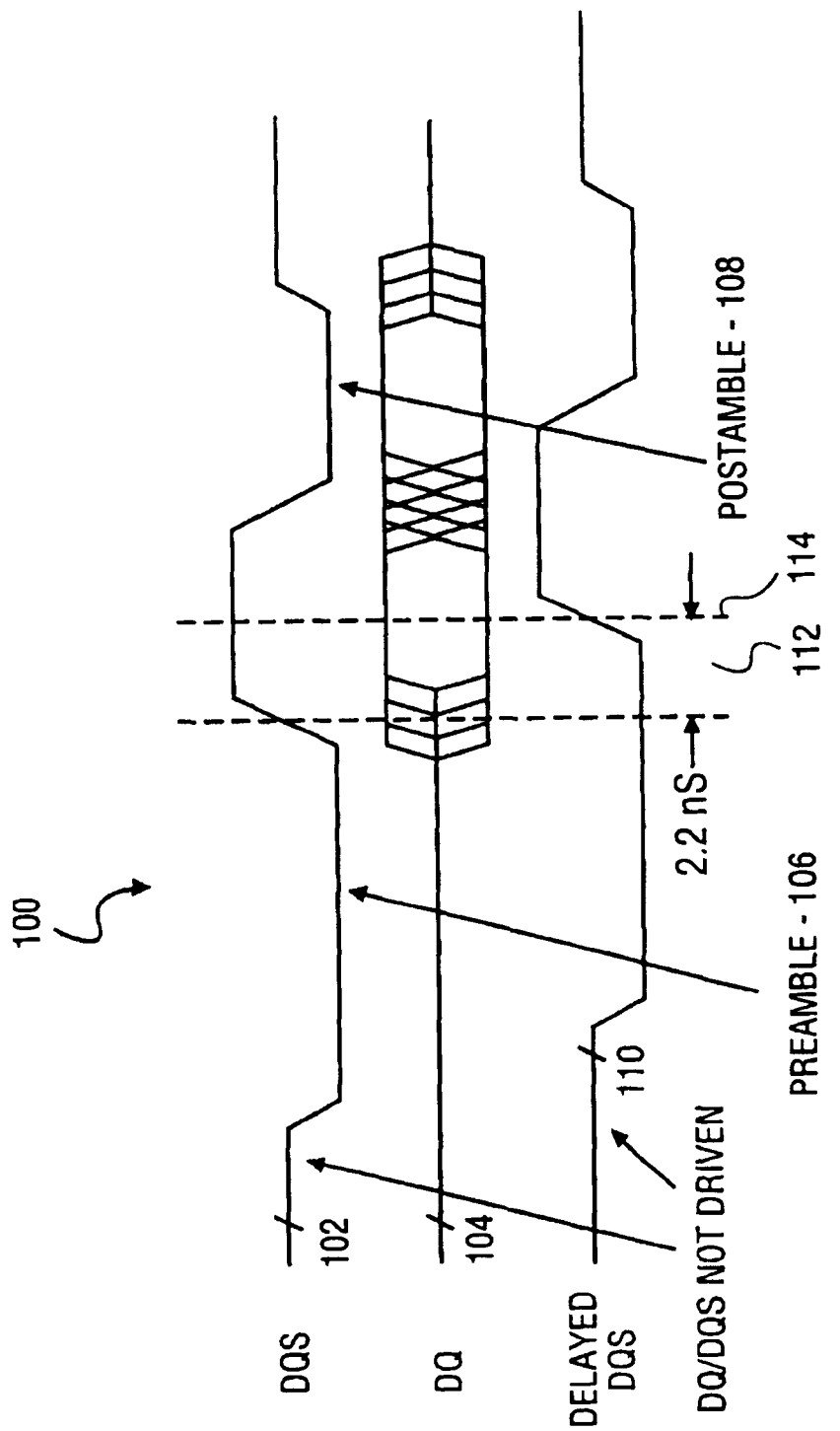
FIG. 1 depicts a timing diagram illustrating DDR data and strobe signal as known in the art.

A method and apparatus for control calibration of multiple memory modules within a memory channel are described. The method includes selecting a memory channel from one or more memory channels coupled to a controller. Next, a memory module, coupled to the selected memory channel, is selected. A path delay is then determined for the selected memory module. The path delay includes a time interval for receipt of a data signal following the issuance of a command to the selected memory module. Once determined, the path delay is stored. Accordingly, when the controller issues a command to the selected memory module, a controller receiver is enabled to capture a data signal following the time interval defined by the path delay. This process is repeated until a path delay is determined for each memory module of each memory channel coupled to the controller.

As described herein, the term "control calibration" refers to the selection of a path delay for a respective memory module, such that no unintended bit values are captured by the controller when the strobe line is not being driven by the respective memory module. In an embodiment of the invention, the path delay is selected to be at least as long as a roundtrip flight time interval between the controller and the memory module, plus a memory read latency interval of the respective memory module. In addition to avoiding the capture of unintended bit values, a further advantage is that only the controller needs to be modified to have the ability to determine this path delay time interval. Accordingly, the design and operation of existing memory modules is not altered. As will be described below, the various embodiments of the invention allow the controller to "know" when each memory module will be driving the strobe signal during a read operation. In addition, the various embodiments of the invention allow the controller to "know" when a next operation is not a "read" command. As a result, the controller receiver is not enabled until just before the strobe is asserted.

In the following description, for the purposes of explanation, numerous specific details are set forth in order to provide a thorough understanding of the present invention. It will be apparent, however, to one skilled in the art that the present invention may be practiced without some of these specific details. For example, various signals, layout patterns, memory cell configurations and circuits, and logic circuits may be modified according to the teachings of the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

System Architecture

Figure 2:
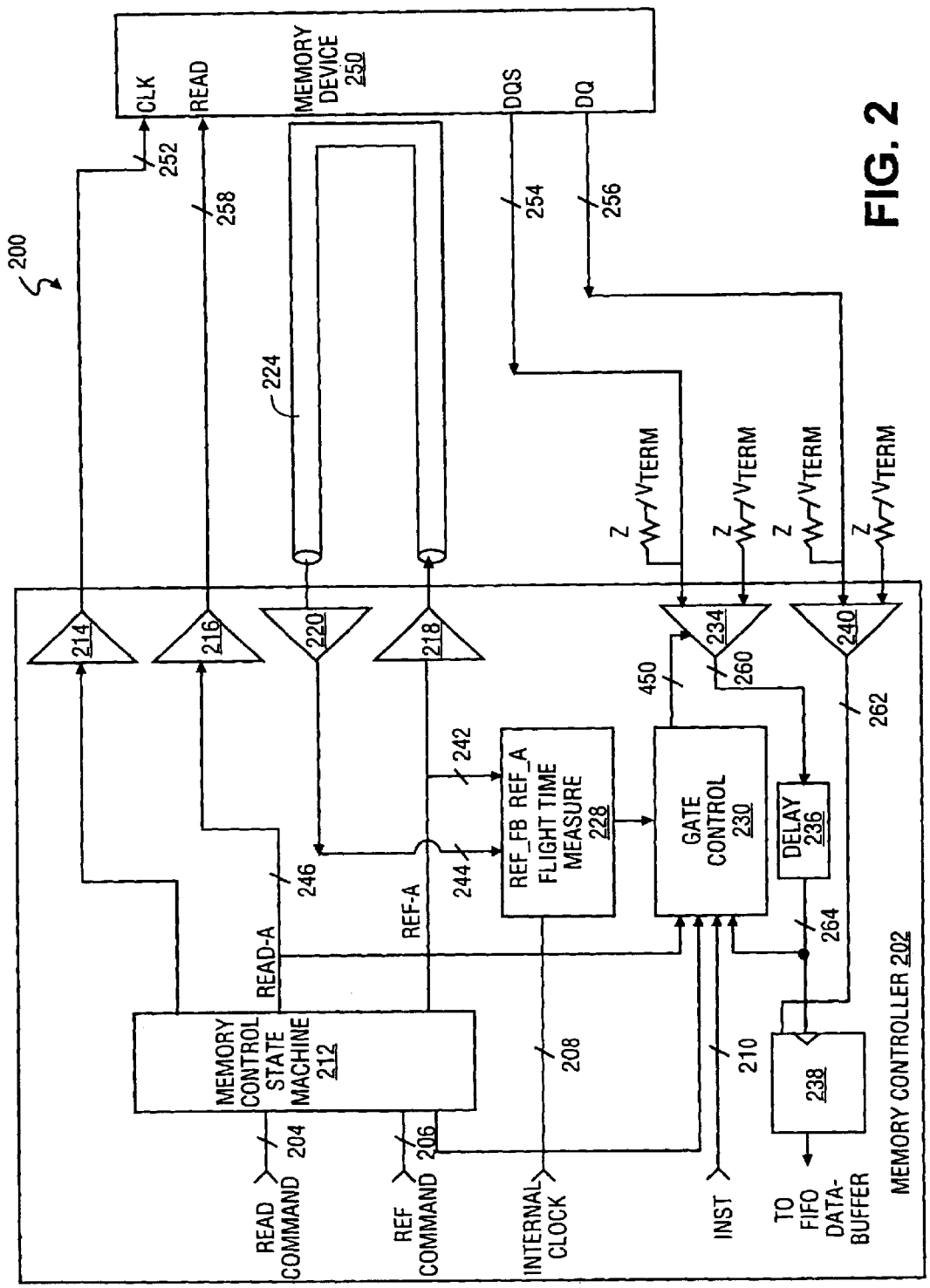
FIG. 2 shows a block diagram of a memory subsystem configured according to an embodiment of the invention.

FIG. 2 illustrates a memory subsystem 200 designed according to an embodiment of the invention. The system features a controller 202 that is coupled to a memory device 250. The memory device 250 may be a single IC die that includes an array of volatile storage cells which can be randomly accessed by a read command received from the controller 202. The controller 102 may be part of a separate memory controller IC die, a memory repeater hub IC die, or a processor die. Communication between the controller 202 and the memory device 250 is via a parallel bus on which a READ signal 258, a clock (CLK) signal 252, a strobe (DQS) signal 254, and a data (DQ) signal 256 are transmitted. There may be multiple data signals in which bit values are captured according to a single strobe signal, although for purposes of conciseness only one data signal is illustrated here.

The interface in the controller 202 to the conductive lines that form the bus between the controller 202 and the memory device 250 includes a number of receivers 220, 234, and 240, and a number of drivers 214, 216, and 218. Each of these serves to translate between the signaling levels on the bus and those in the controller's IC die. The receiver 234 has two inputs both of which, in one embodiment, are terminated at the same voltage Vterm through the same termination impedance Z. This equal termination scheme helps avoid distorting the duty cycle of the received strobe signal 254 and the resulting output signal of the receiver 234.

A receiver 234 is gated in that a control input which receives a control signal 450 from gate control circuit 230 is provided to selectively forward the strobe signal 254. The output 260 of the gated receiver 234 is fed to the clock input of a latch 238 via a delay block 236. The delaying of the forwarded strobe signal 260 in this manner allows the latch 238 to capture the bit value in the data signal in a more reliable manner by moving the latch clock to approximately the middle of the bit valid data window.

When the gated receiver 234 is disabled, its output 260 is driven to a predetermined logic state and stays at that logic state, until the receiver is again enabled so that the strobe signal 254 may be forwarded. By keeping the output of the receiver 234 at a fixed, predetermined logic state, latch 238 receives no edges at its clock input and therefore does not capture any bit values in the data signal.

The gate control circuit 230 features a delay circuit to provide a delay of a predetermined time interval to a memory read command 204. In the embodiment shown in FIG. 2, this read command 204 is sent to a memory control state machine 212 to yield the READ_A signal 246. The output 260 of the gated receiver 234 is enabled, in this embodiment, when READ_A 246, after being delayed by the predetermined interval, reaches the gated receiver 234.

The controller 202 also features time interval measurement circuitry that is designed to determine a value representative of a roundtrip flight time interval of a pulse that is sent from the controller 202 to the memory device 250 and back to the controller 202. An embodiment of such a circuit is the flight time measure circuit 228. In one embodiment, the flight time measure circuit 228 determines the time interval between pulses being asserted at two inputs labeled REF_A 242 and REF_FB 244. The controller 202 sends a reference pulse 242 through the driver 218 and receives a return pulse 244 through receiver 220. This reference pulse may, if desired, is phase aligned to the internal clock 208 of the controller 102.

The physical path of this reference pulse, where the physical path may be implemented by a single conductive line 224 as in this example, should emulate the paths of the READ 204 and the DQS (strobe) signals 254 that are being sent between the controller 202 and the memory device 250. In one embodiment, the conductive line 224 forms a conductive loop. However, an alternative would be to terminate the loop physically near the memory device 250 with either passive or active components if doing so would better emulate the path of the READ 204 and DQS signals 254. In addition, the receiver 220 and driver 218 should also emulate the receiver 234 on the DQS line and driver 216 on the READ line, to help match as closely as possible the time delay experienced by the transmission of the READ signal 204 and receipt of the DQS signal 254.

The actual measurement of the roundtrip flight time interval by the flight time measure circuit 228 may be performed according to a wide range of well known techniques for measuring the time that lapses between two pulse signals. For instance, a timer could start counting upon a rising edge of REF_A 242, where the count is incremented in accordance with the edges of the internal clock 208, and to stop counting upon a rising edge of REF_FB 244. This means that the accuracy or granularity of the roundtrip flight time that is being measured is a function of the frequency of the internal clock 208, such that if the internal clock 208 has a relatively high frequency, then the granularity of the roundtrip flight time measurement is also finer. An alternative to using the internal clock 208 as a time base would be to use a separate, higher speed clock just for making the roundtrip flight time measurement. In both cases, once the roundtrip flight time interval has been measured, by the circuit 228, this information is passed on to the gate control circuit 230 which provides a delay of a predetermined time interval that is at least as long as the measured roundtrip flight time interval.

Returning briefly to the memory control state machine 212, this unit serves to generate READ_A 246 and REF_A 242 and CLK 252, using the highly stable and accurate internal clock 208 as a base timing signal.

Figure 3:
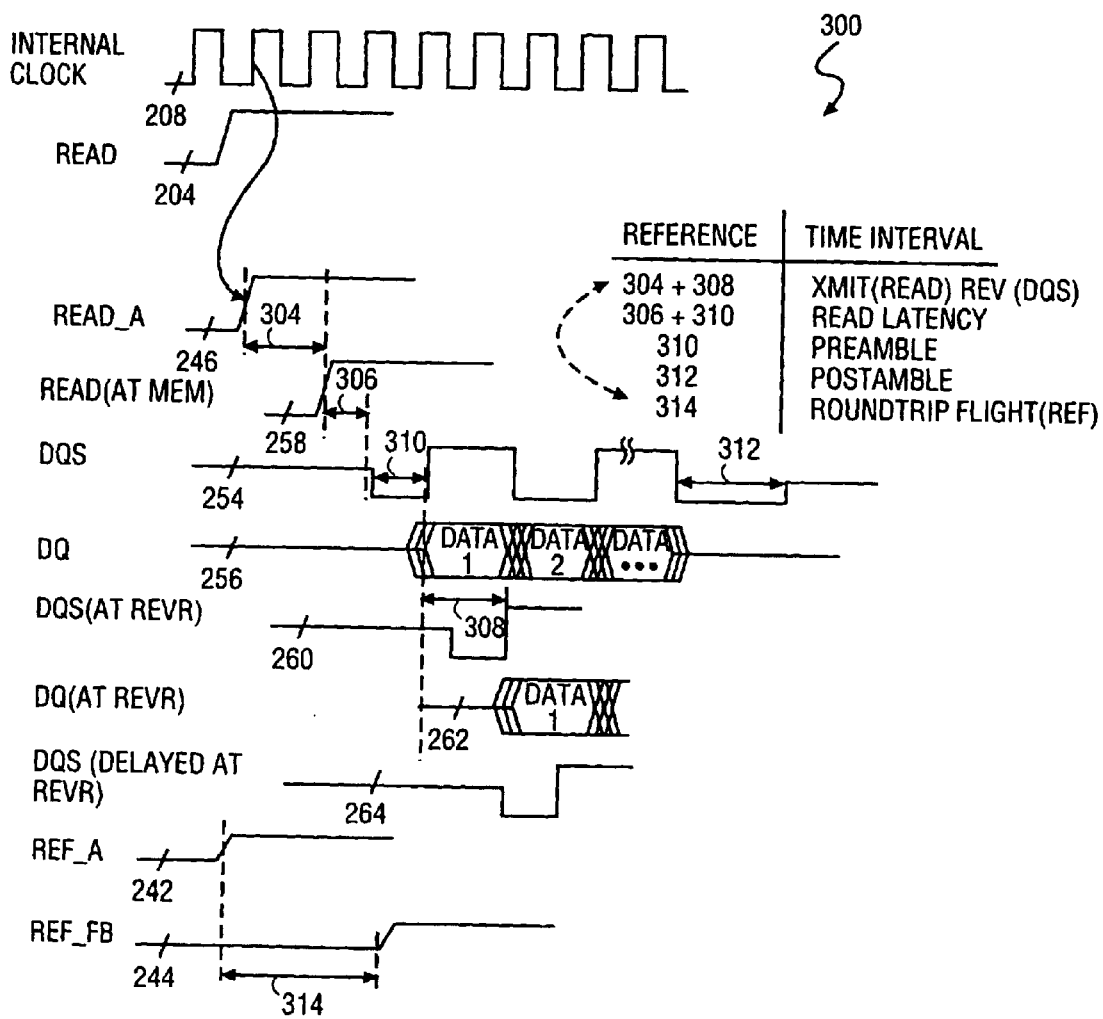
FIG. 3 illustrates a timing diagram of signals found in an exemplary implementation of the memory subsystem.

Referring now to FIG. 3, what's shown is a timing diagram of various signals in the system of FIG. 2 to illustrate operation of the system. At the top of the timing diagrams, a READ command 204 is latched according to a rising edge of the internal clock 208. This is done by the memory control state machine 212 which generates the READ_A signal 246. This signal is then translated into the READ signal 258 by the driver 216 and transmitted from the controller 202 to the memory device 250. The READ signal 258 is received at the memory device 250 after a flight time interval 304. Meanwhile, the DQS 254 and DQ 256 signals are not yet being driven by the memory device 250.

Following a read latency interval that is composed of an initial interval 306 (that could, for instance, be the column address strobe (CAS) latency) and a subsequent interval 310, the DQS signal 254 is asserted by the memory device 250 in response to receiving the READ signal 258. The interval 310 which immediately precedes the assertion of DQS 254 is known as the preamble. The preamble interval 310 is specified by the JEDEC DDR standard, mentioned above, to allow the system to tolerate some variation in the timing of the I/O signals between the memory device 250 and the controller 202. At the end of the preamble interval 310, DQS 254 is asserted at the same time as the first bit value is asserted on the DQ line 256.

In the embodiment shown in FIG. 3, the protocol for the DQS 254 and DQ 256 signals allows a bit value to be asserted simultaneous with each rising or falling edge of DQS 254. Thus, the bit values 1, 2, . . . are available starting at alternate rising and falling edges of DQS 254. After the last bit value has been asserted, a time interval 312, known as the postamble, follows the last falling edge of DQS 254. Thereafter, the DQS line 254 is returned to its non-driven state as shown. It should be noted that the invention may also be used with a protocol in which only the rising or falling edge, and not both, of DQS 254 are used to mark the associated bit values.

The DQS and DQ pulses are received at the controller 202 following a DQS/DQ flight time interval 308. The received DQS 260 is further delayed at the controller, such that its rising or falling edge is positioned closer to the middle of its associated data pulse, for more reliable data capture. This small delay is accomplished by the delay block 236 (see FIG. 2).

Figure 4:
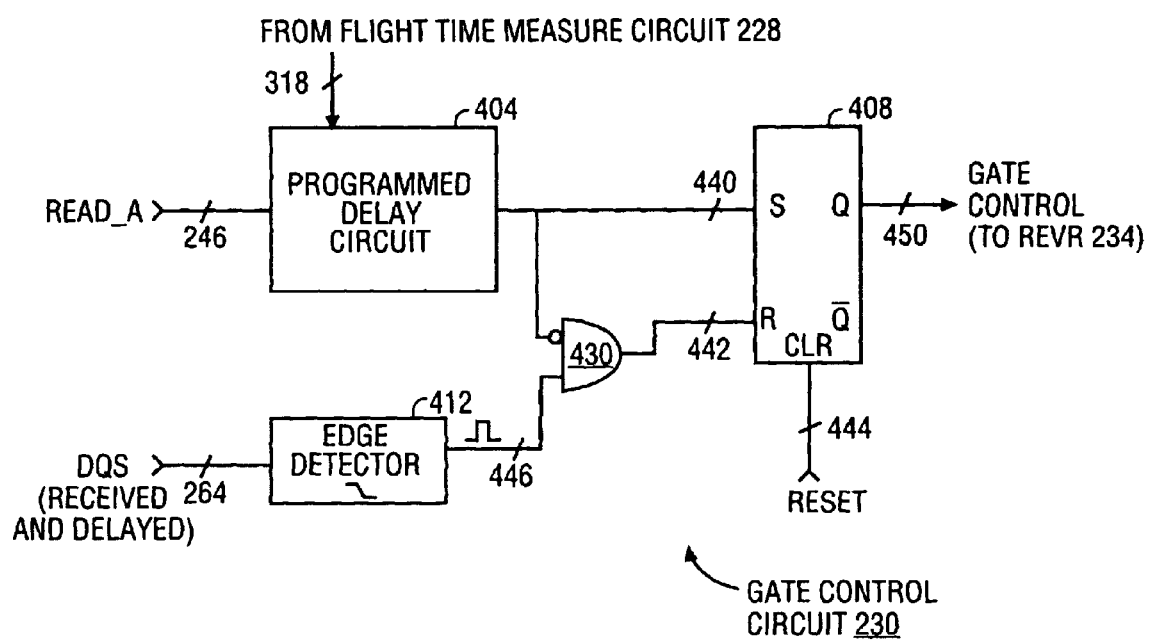
FIG. 4 depicts a block diagram of an exemplary implementation of the gate control circuitry used in the memory subsystem.

The last two waveforms in FIG. 3 are the reference and feedback reference signals REF_A 242 and REF_FB 244, respectively. The roundtrip flight time interval 314 for the reference signal should be, in one embodiment, approximately the same as the transmit and receive intervals for the READ Command 204 and DQS signals 254, that is the sum of intervals 304 and 308. Armed with a knowledge of this roundtrip flight time interval 314, as well as the read latency interval (interval 306 plus preamble interval 310), the designer of the controller 202 will be able to design the gate control circuit 230 (see FIG. 1) such that READ_A 246 is subjected to the correct time delay. FIG. 4 shows a particular implementation of the gate control circuit 230 that subjects the READ_A signal 246 following this path delay.

Figure 5:
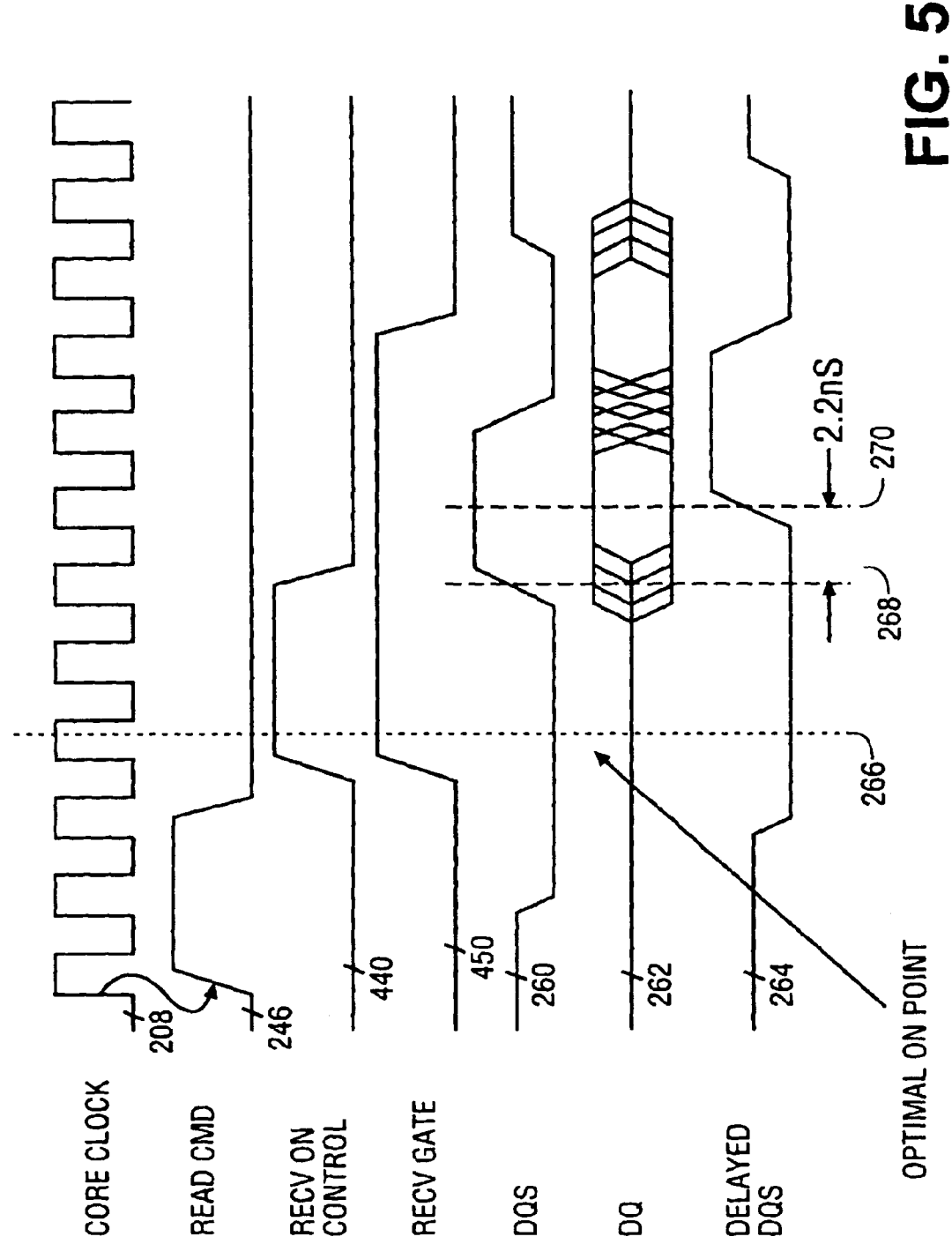
FIG. 5 depicts a timing diagram of signals in the gate control circuitry of FIG. 4.

In FIG. 4, the gate control circuit 230 features a programmed delay circuit 404 which provides a programmed delay (equal to the roundtrip flight time interval 314 plus read latency 306 plus preamble interval 310) to an input READ_A signal 246 (See FIG. 3). The output of the programmed delay circuit 404 is fed to the S input of a S-R flip-flop 408 whose output is the gate control signal 450 provided to the gated receiver 234 (see FIG. 2). For the embodiment of the invention whose operation is illustrated using the timing diagram of FIG. 2, the total programmed delay to which READ_A 246 is subjected in FIG. 4 includes at least the roundtrip flight time interval 314 of the reference pulse, plus the memory read latency, which includes intervals 306 and a substantial portion of the preamble time interval 310. In this manner, the output of the predetermined variable delay block 404 is asserted at a point in time which is within the preamble 310 but substantially before the end of the preamble 310, as shown in the timing diagram of FIG. 5. This may be considered an optimal point 266 in time at which to enable the receiver 234 so as to forward the strobe signal 262.

The disabling of the receiver 234 is accomplished, in this embodiment, by resetting the output of the S-R flip-flop 408 by asserting 442 a pulse at the R input of the flop 408. This pulse is asserted by an edge detector 412 in response to detecting a last falling edge of a delayed version of the received DQS signal. Finally, a logic gate 430 receives a complement of the receiver control signal 440, indicating that the next memory command is not read, and the pulse signal 446 to perform a logical AND operation and generate the reset pulse signal 442. Referring to the timing diagram of FIGS. 3 and 5, it is clear that the gate control circuit 230 asserts the gate control output 450 in this embodiment substantially in the middle of the preamble interval 310 and deasserts that signal 450 approximately in the middle of the postamble interval 312 which follows the last falling edge of the received DQS signal 254.

Figure 6:
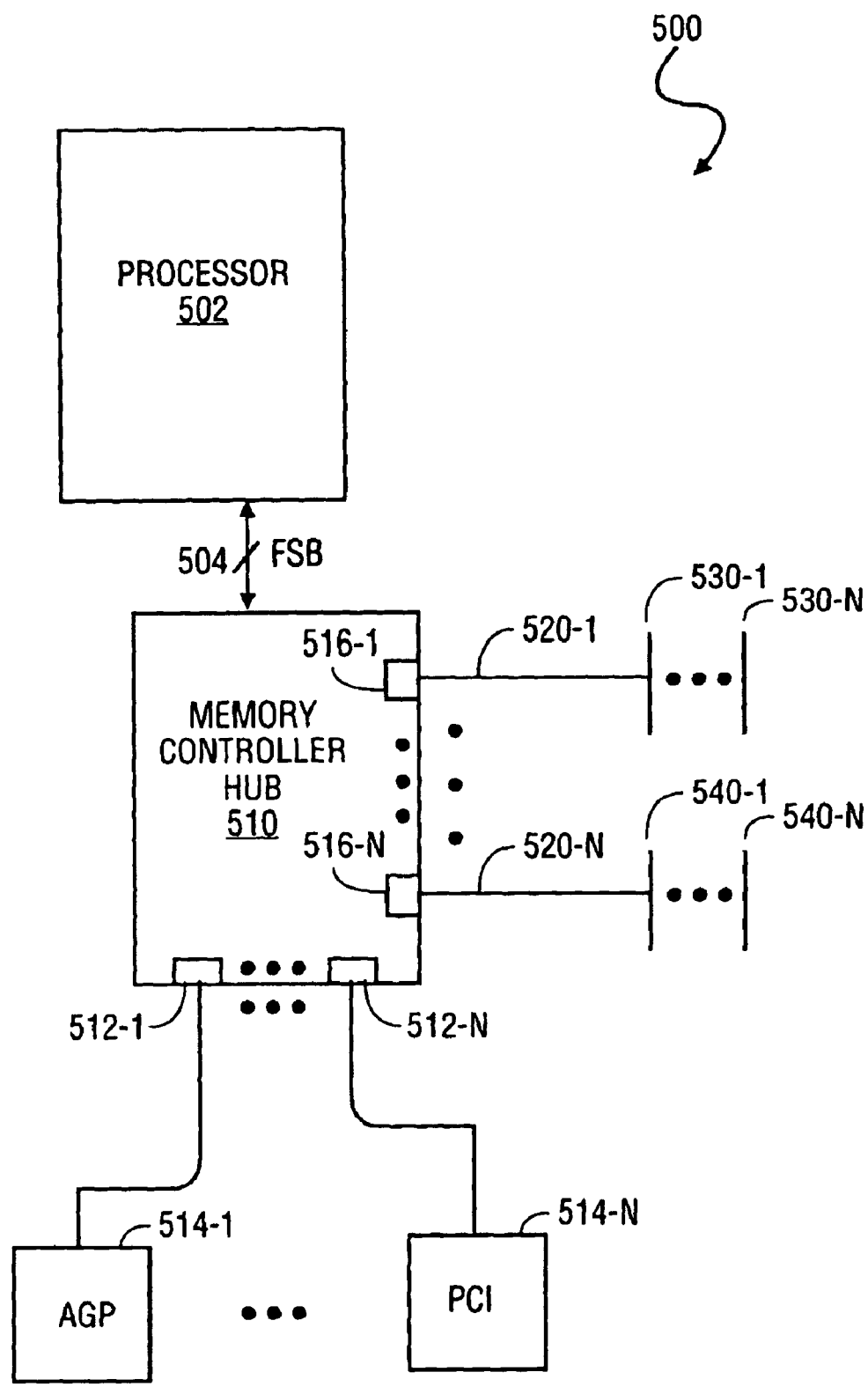
FIG. 6 depicts a block diagram illustrating a system, including a memory controller hub having one or more memory channels in accordance with the further embodiment of the present invention.

Referring now to FIG. 6, a block diagram depicting a memory controller system 500 is illustrated. The memory controller system 500 includes a memory controller hub 510. The memory controller hub is coupled to a processor 502 via a front side bus (FSB) 504. The memory controller 510 further includes one or more ports 512 (512-1, 512-2, . . . 512-N), for interfacing to one or more graphics cards, for example, the accelerated graphics port (AGP) or peripheral connection interface (PCI) cards 514 (514-1, 514-2, . . . 514-N).

However, contrary to the memory controller depicted in FIG. 2, the memory controller hub 510 may include one or more input/output (I/O) ports 516 (516-1, 516-2, . . . 516-N) for interfacing to one or more memory channels 520 (520-1, 520-2, . . . 520-N). Each of the memory channels 520 includes one or more memory modules 530 (530-1, 530-2, . . . 530-N) as well as memory modules 540 (540-1, 540-2, . . . 540-N). The memory modules 530/540 are generally coupled to slots and connected in an in-line manner, such that each memory module 530/540 has a varying lead-in-length from the memory controller hub 510. Consequently, the receipt of a strobe signal from the one or more memory modules 530 will vary depending on the lead in length, as well as various other factors.

Figures 7, 8:
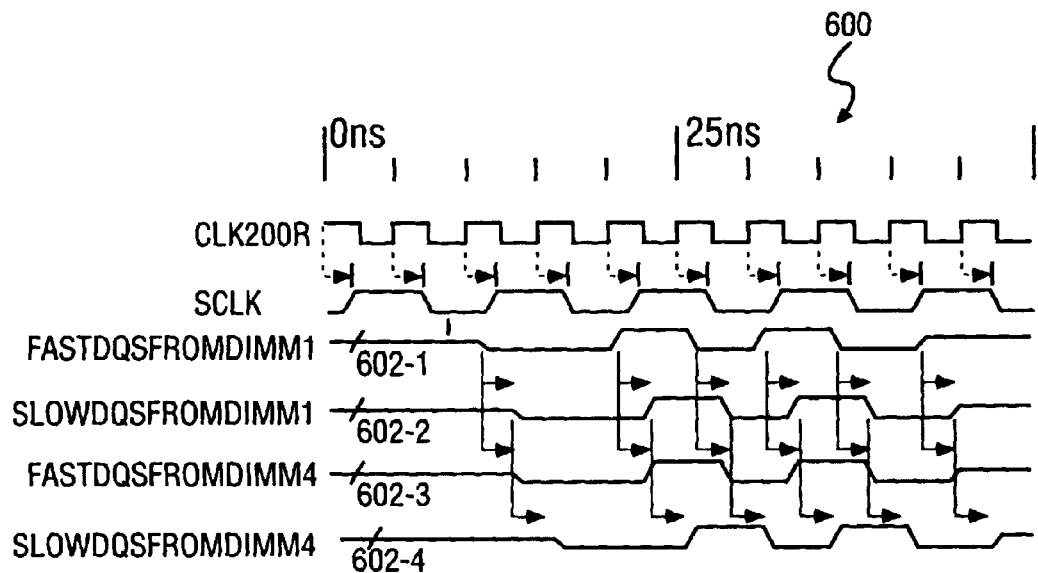
FIG. 7 depicts a timing diagram illustrating various delays encountered by multiple memory modules attached to a single memory channel in accordance with an embodiment of the present invention.
FIG. 8 depicts a table illustrating sources of delays encountered by one or more memory modules attached to a memory channel.

Referring now to FIG. 7, a timing diagram 600 is depicted which illustrates potential variations in strobe signals received from a memory channel containing four dual in-line memory modules (DIMMs). In the embodiment described, the memory modules 530 coupled to the memory channel 520 are dual inline memory modules. As known to those skilled in the art, a DIMM is essentially a double single inline memory module (SIMM). Similar to a SIMM, a DIMM is a module containing one or several random access memory (RAM) chips on a small circuit board with the pins that connect the DIMM to a computer mother board. In contrast to a SIMM, a DDR DIMM has 184 pin connectors and supports either 64 bit or 72 bit data transfer transactions. For synchronous dynamic RAM (SDRAM) chips, a DDR DIMM can be used instead of a pair of SIMMs installed in in-line pairs.

Referring again to the timing diagram 600 depicted in FIG. 7, the variation in the strobe signal (DQS) 602 (602-1, ..., 602-4) received by the memory controller receiver can vary by as much as five nanoseconds. This problem is exacerbated by the fact of the allowed strobe variation provided for in the JEDEC DDR specification (as described above) and differences caused by various factors. These factors include DIMM clock error since each of the devices on a DIMM do not see the clock at the same time. In addition, data groupings will result in different delays. For example, all signals within a group have the same trace length, but different groups can have different trace lengths which vary from each other. In fact, there are nine groups associated with each DIMM.

Furthermore, the lead-in length for each DIMM will vary when the DIMM are connected in an in-line manner. Moreover, the memory controller hub 510 has slightly different delays internally for each of the data groups. Finally, control for enabling data and strobe buffers incurs delays that vary with process/temperature/voltage (PVT) and jitter of the system clock. These various sources, as illustrated by the table depicted in FIG. 8, lead to a possible strobe variation of 3000 pico seconds (ps). Consequently, referring again to FIG. 6, it is not possible to use the roundtrip flight-time interval described above to calculate a delay for receipt of a strobe signal from a first memory module of at least lead-in-length distance to the memory controller hub 510. However, this roundtrip flight-time interval can be used as a starting point in order to calculate a valid calibration for each memory module 530 coupled to each memory channel 520.

Figure 9:
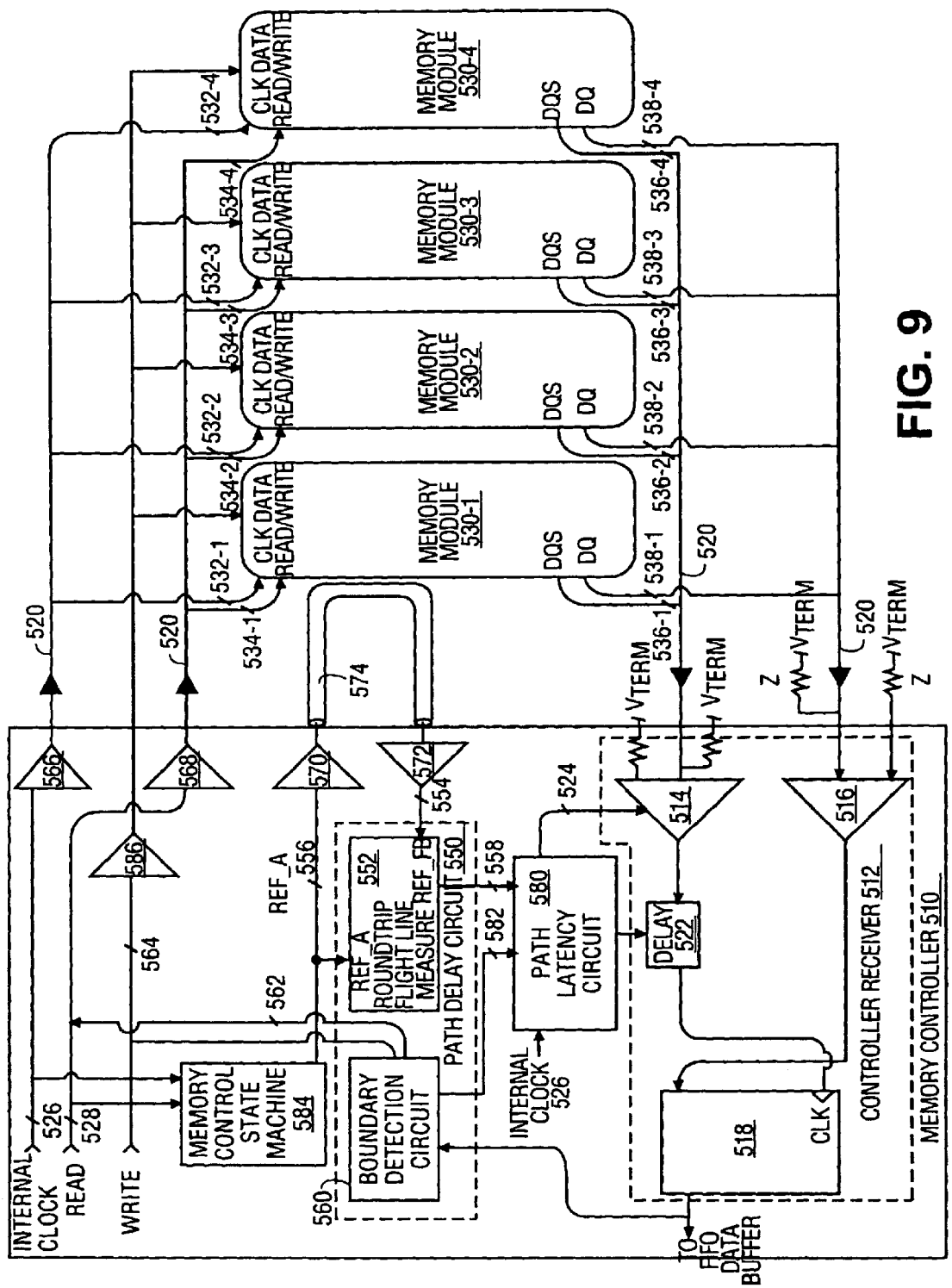
FIG. 9 depicts a block diagram illustrating a memory controller in accordance with the exemplary embodiment of the present invention.

Referring now to FIG. 9, a block diagram of a memory controller 510, for example as depicted in FIG. 6, is illustrated in accordance with an exemplary embodiment of the present invention. The memory controller 510 includes a memory controller receiver 512, which is designed to capture data (DQ) 538 (538-1, ..., 538-4) in response to a strobe signal (DQS) 536 (536-1, ..., 536-4). The controller receiver 512 includes a strobe receiver 514 and a data receiver 516. However, as described above, the strobe receiver 514 is enabled in response to a receiver enable signal 524 in order to avoid data loss when the DQS signal 536 is not being driven by the selected memory module 530. The receiver enable signal 524 is asserted following a programmed delay interval from issuance of a read command. As described above with reference to FIG. 3, the programmed delay includes the roundtrip flight-time interval 318, a read latency in the memory module for acquiring the data, and a substantial portion of a preamble interval 310. The DQS signal 536 is further subjected to a predetermined delay before being transmitted by delay block 522 to the controller receiver 512 to capture data bits within the DQ signal 538.

As described above, the roundtrip flight-time interval measures a roundtrip delay between the controller receiver 512 and a first DIMM 530-1 coupled to the memory channel 520. This is accomplished by sending a reference signal REF_A 556 and measuring a flight time interval for return of the reference signal as REF_FB 554. As described above, because the DQS signal 536 during a read command has a relationship to the internal clock 526 supplied by the memory controller 510, the REF_FB signal 554 will have the same timing as a real DQS signal 536 from the selected memory module 530. As such, a flight-time measurement circuit 552 measures a roundtrip flight-time interval of the REF-A signal 556 and the REF_FB signal 554 which is provided to a path latency circuit 580 to generate a receiver enable signal 524.

Unfortunately, due to the various sources that are described in the table depicted in FIG. 8, the roundtrip flight-time interval for the various memory modules 530 coupled to the memory channel 520 will vary. Consequently, it is as necessary to fine tune the calculation of the roundtrip flight time interval in order to determine a more accurate programmed delay. In summary, this is accomplished by calculating an initial roundtrip flight-time interval (RFI) to the first memory module coupled to the memory channel 520. Once calculated, the RFI is used as a starting point, and fine tuned in order to calculate a path delay. The fine tuning is accomplished by a path latency circuit 580 which generates the receiver enabled signal 524 for the DQS signal receiver gate 514. In other words, the programmed delay generated by the programmed delay circuit 404 is fine-tuned for each memory module 530 coupled to memory controller 510 (See FIG. 4).

The path latency circuit 580 utilizes a boundary detection circuit 560 to write an M-word burst pattern and an N-word burst pattern into consecutive locations of a selected memory module 530. Once written, the boundary detection circuit 560 utilizes an initial variable time interval (IVTI) for selectively reading values from the selected memory module 530 by enabling the DQS signal receiver gate 514. In one embodiment, the IVTI includes the roundtrip flight-time interval plus the read latency plus a substantial portion of the preamble interval (See FIG. 3). This is repeated by increasing the variable time interval until a boundary memory location of the selected memory module between the M-word burst and the N-word burst is detected. Using a final value of the variable time interval, the path latency circuit calculates a final path delay for the selected memory module 530. Once this final path delay is calculated, the DQS signal receiver gate 514 is enabled to capture the DQS signal 536 which is further delayed by delay circuit 522 for a predetermined time to properly capture the DQ signal 538. For example, referring again to FIG. 4, the programmed delay 406 would be set to the path delay of the selected memory module 530.

Figure 10:
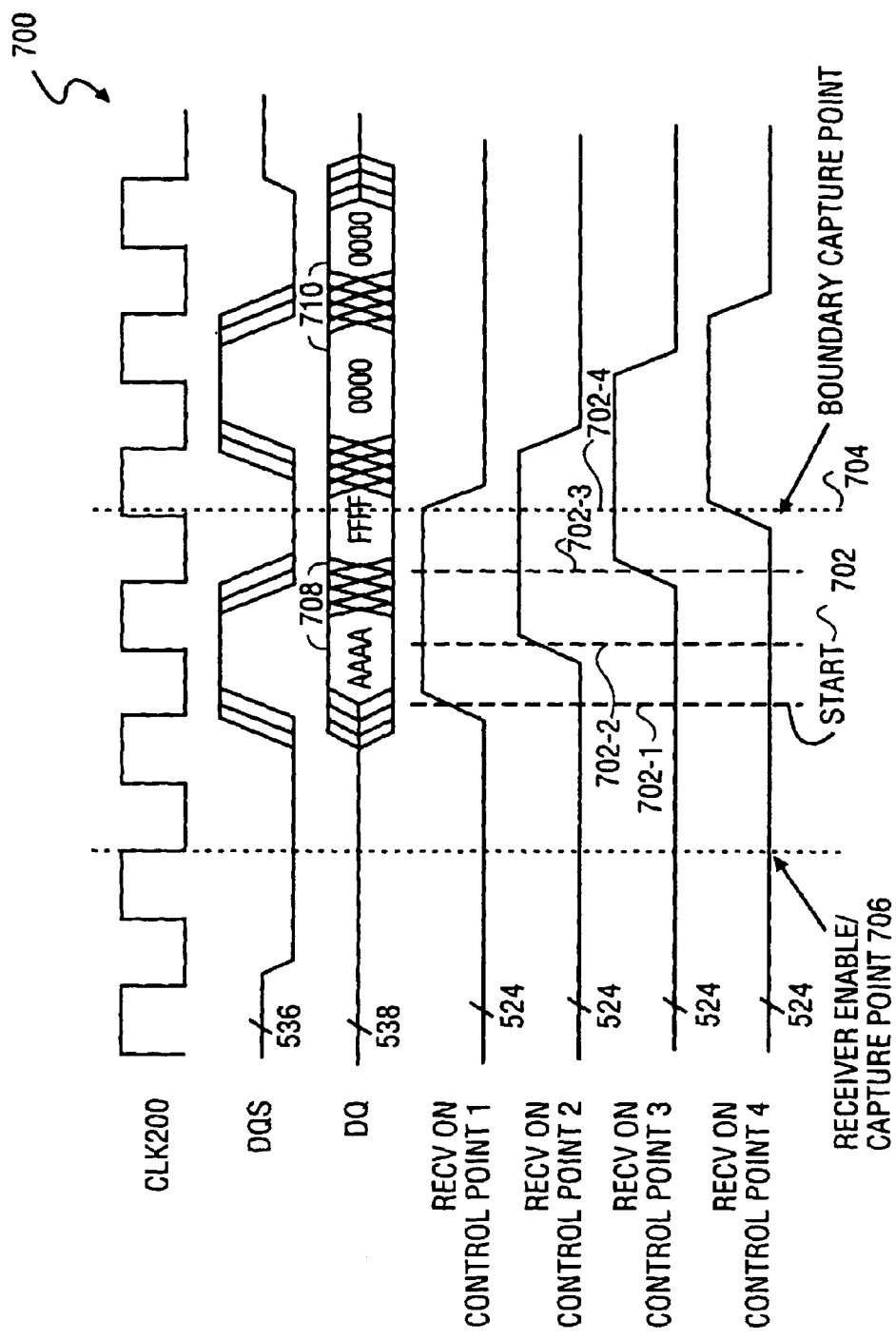
FIG. 10 depicts a timing diagram illustrating the detection of a boundary memory location within a memory module in accordance with the exemplary embodiment of the present invention.

Detection of the boundary memory location 704 in a selected memory module 530 is clearly illustrated with reference to the timing diagram 700 as depicted in FIG. 10. Utilizing the following equation (units of the equation are listed in control clocks), a start point 702 or IVTI is calculated as follows:

$$IVTI = 1 + RFI + ((\text{Read latency}) \times CG(\text{control granularity})). \quad (1)$$

In other words, the start point 702 or IVTI (initial variable time interval) is a time mark where DQS signal 536 is being driven with high probability. The RFI value +1 element ensures that the starting point 702 is within an area where the DQS signal 536 is being driven. The CG element equals the number of control clocks per memory clock cycle and may vary depending on the frequency of the control clock. For example, in one embodiment, the control clock is running at four-times the frequency of the memory clock. Accordingly, the control granularity (CG) is equal to four.

Referring again to the timing diagram 700, the timing diagram 700 utilizes two non-zero values and two zero values which are written into consecutive memory locations of the selected memory module 530. Utilizing the equation described above, the start point 702 or the initial variable time interval is calculated. Using the start point 702 as the receiver-enable delay of the selected memory module 530, a read command is issued. Accordingly, following a time interval, as defined by the receiver-enable delay, from issuance of the read command, the path latency circuit 580 enables the strobe receiver gate 514 and captures a first and second bit value from the selected memory module 530. This process is repeated by increasing the start point 702 (702-1, . . . , 702-4) until a boundary memory 704 location between the non-zero pattern 708 and the zero pattern 710 is detected, as illustrated by the boundary capture point 704. In one embodiment, the start point 702, or variable time interval is increased by a pre-determined amount, which is based on the control clock granularity. In other words, the receiver-enable delay is increased until the boundary memory location is detected. Using this final variable time interval (FVTI), the following equation can be used to calculate a receiver enable/capture point 706 or path delay for the selected memory module 530:

$$\text{path delay} = FVTI - (\text{memory clock cycle }(MCC)-1) - RFI - ((\text{Read latency}-1)*(CG)). \quad (2)$$

In other words, the receiver enable/capture point 706 (memory clock cycle (MCC+1)) or path delay of the selected memory module 530 is roughly a complete cycle earlier, plus one (to round down the path delay) from the boundary detection point 704 or the final variable time interval. Equations (1) and (2) are derived with the elements calculated in control clock units. Consequently, the initial variable time interval (IVTI) and the path delay are calculated in control clock units. Procedural methods steps for implementing teachings of the present invention are now described.

Operation

Figure 11:
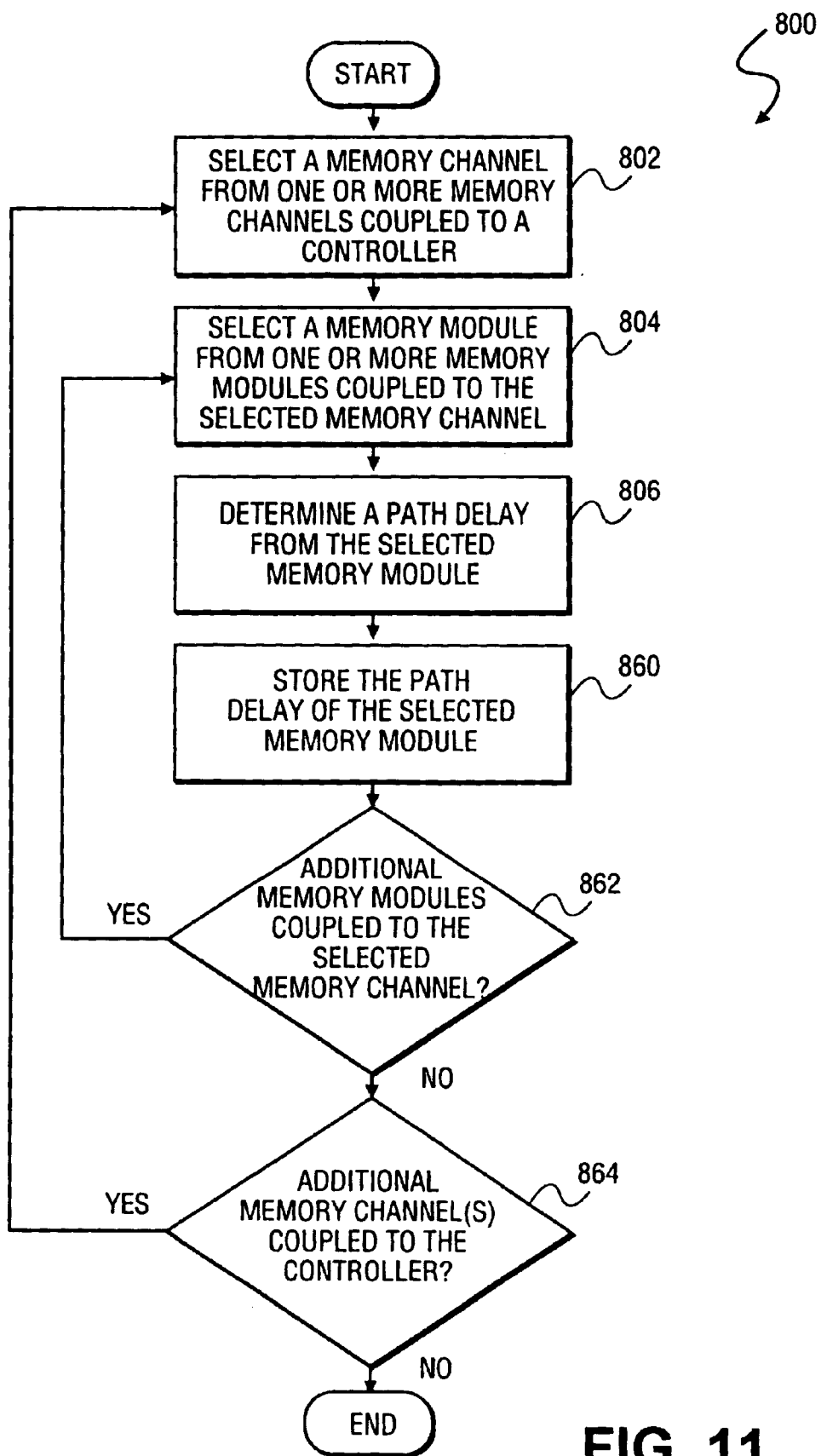
FIG. 11 depicts a flow chart illustrating a method for control calibration of multiple memory modules within a memory channel in accordance with an embodiment of the present invention.

FIG. 11 depicts a flow chart illustrating a method 800 for control calibration of multiple memory modules within a memory channel, for example, in the memory controller system 500, as depicted in FIGS. 6 and 9. At process block 802, a memory channel from one or more memory channels 520 coupled to the memory controller 510 is selected. At process block 804, a memory module 530 is selected from one or more memory modules coupled to the selected memory channel 520. At process block 806, a path delay is determined for the selected memory module 530. At process block 860, the path delay of the selected memory module 530 is stored to ignore non-driven DQS signals and properly capture DQ data. At process block 862, process blocks 804–860 are repeated for each memory module 530 coupled to the selected memory channel 520. Finally, at block 864, process blocks 802–862 are repeated for each memory channel 520 coupled to the memory controller hub 510.

Figure 12:
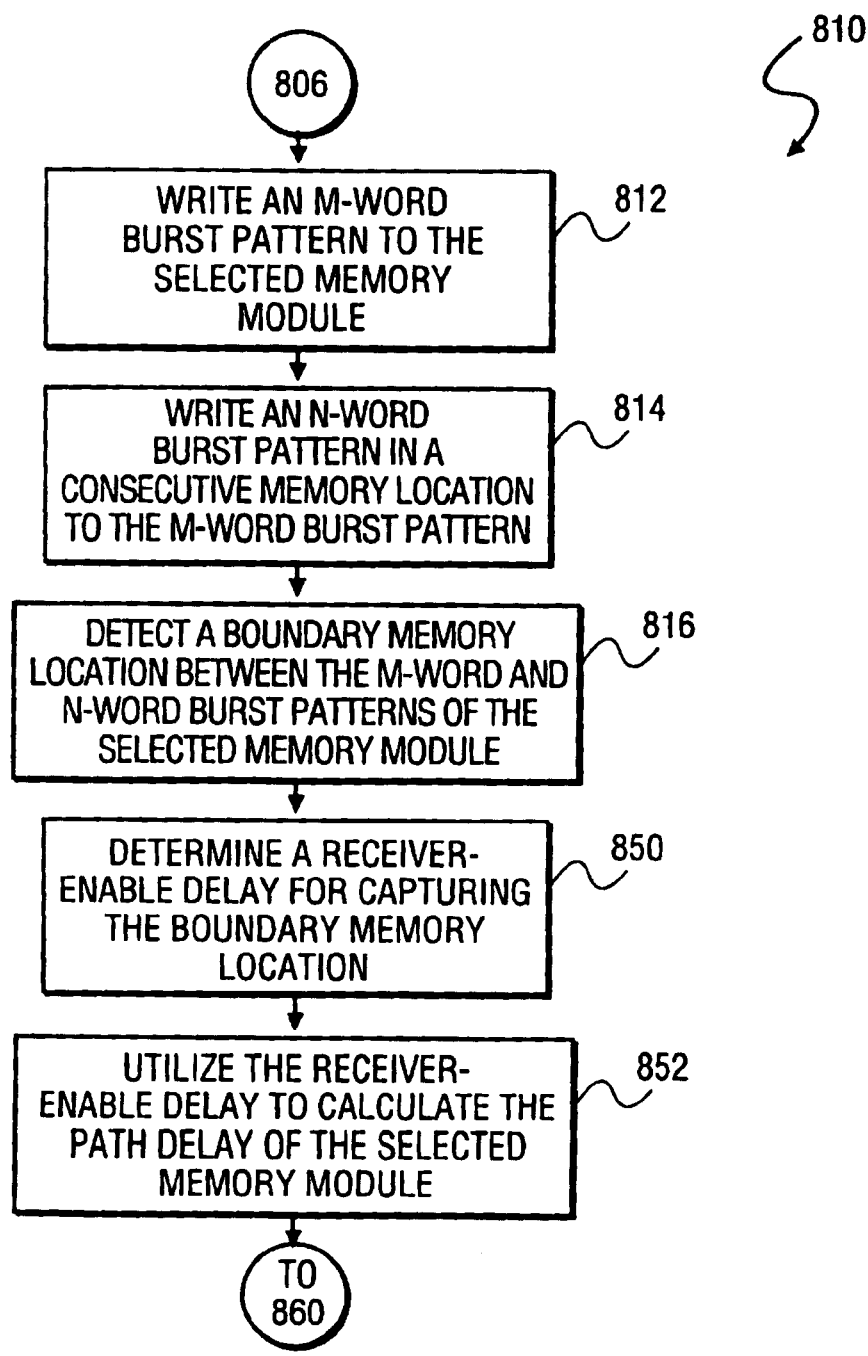
FIG. 12 depicts a flow chart illustrating methods for determining a path delay for a selected memory module in accordance with the further embodiment of the present invention.

Referring now to FIG. 12, a flow chart of process blocks illustrating a method 810 for determining a path delay of a selected memory module, as described in process block 806, is now described with reference to FIG. 10. The determination of the path delay for the selected memory module 530 is initially determined by a path latency circuit 580 as depicted in FIG. 9. The path latency circuit 580 directs a boundary detection circuit 560 to write an M-word burst pattern to the selected memory module at process block 812. At process block 814, the boundary detection circuit 560 writes an M-word burst pattern in a consecutive memory location to the N-word burst of the selected memory module 530. At process block 816, the boundary detection circuit 560 detects a boundary memory location between the M-word burst pattern and the N-word burst pattern of the selected memory module 530, as depicted in FIG. 10. The boundary memory location 582 is then transmitted to the path latency circuit 580. At process block 850, the path latency circuit 580 determines a receiver-enable delay for capturing the boundary memory location 580. Finally, at process block 852, the path latency circuit 580 utilizes the receiver-enable delay to calculate the path delay of the selected memory module 530.

Figure 13:
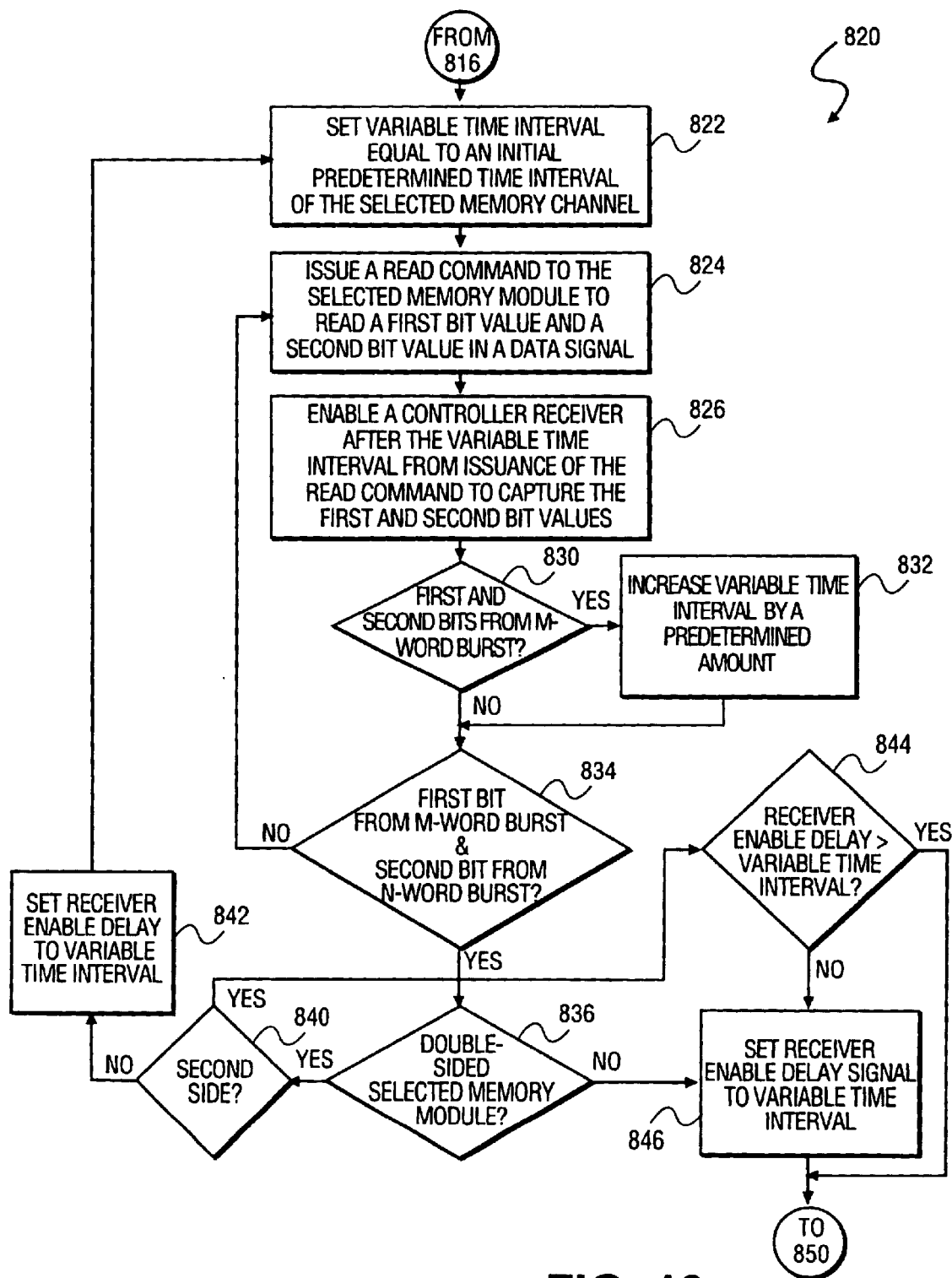
FIG. 13 depicts additional methods for detecting a boundary memory location of a selected memory module.

FIG. 13 depicts a flow chart illustrating a method 820 for detecting the boundary memory location in the selected memory module, as referred to in process block 816, for example in the memory controller 510 depicted in FIG. 9. At process block 822, the boundary detection circuit 560, calculates an initial variable time interval (IVTI) using the roundtrip fight-time interval 558 and the read latency of the selected memory channel 520 in equation (1) described above. The roundtrip flight-time interval, as described above, is initially calculated by the flight time interval circuit 552, which is generally sufficient for memory controllers which do not include multiple in-line memory modules or multiple memory channels. At process block 824, the boundary detection circuit 560 issues a read command to the selected memory module 530 to receive a first bit value and a second bit value in DQ signal 538. At process block 826, the path latency circuit 580 enables the controller receiver, following the variable time interval from issuance of the read command to the selected memory module, thereby directing the DQS signal receiver gate 514 to forward the DQS signal 536 and capture the first and second bit values using the latch 518.

At process block 830, it is determined whether the first and second bit values are from the M-word burst pattern. When such is the case, process block 832 is performed and the boundary detection circuit 560 increases the variable time interval by a predetermined amount. The predetermined amount is generally based on the clock granularity and is, for example, 2.5 nanoseconds or one-quarter (¼) of the memory clock cycle time. Otherwise, at process block 834, it is determined whether the first bit is from the M-word burst pattern 708 and the second bit is from the N-word burst pattern 710. When this is the case, the boundary memory location 704 of the selected memory module 530 has been detected by the boundary detection circuit 560.

However, if the memory location boundary has not been detected, process blocks 824 through 830 are repeated until the boundary memory 704 location is detected. When the boundary memory location 740 is detected at process block 836, the boundary detection circuit 560 determines whether the selected memory module 530 is double sided. If the memory module 530 is not double sided, the boundary detection circuit sets the receiver-enable delay equal to the variable time interval and forwards the receiver-enable delay 582 to the path latency circuit 580. Otherwise, at process block 840, the boundary detection circuit 560 determines if the second side of the memory module 530 has already been processed.

Processing of the second side of the selected memory module 530 begins at process block 842. At process block 842, the boundary detection circuit 560 initializes processing of the second side of the selected memory module and sets the receiver enable delay 582 equal to the variable time interval. Consequently, once both sides of the selected memory module 530 are processed, it is determined whether the receiver enabled delay 582 (first side) is greater than the variable time interval (second side). If this is the case, the boundary detection circuit 560 sets the receiver enabled delay equal to the variable time interval and forwards the receiver enabled delay signal 582 to the path latency circuit 580. Otherwise, the receiver enable delay 582 signal is already set. Process blocks 822 through 834 are repeated until a boundary memory location is detected for the second side of the selected memory module 530. Once detected, the receiver enable delay 582 should be set to the variable time interval that is greatest between the first side of the selected memory module 530 and the second side of the selected memory module 530.

Once the receiver enabled delay signal 582 is received by the path latency circuit 580, the path latency circuit 580 can utilize the receiver enable delay signal 582 to calculate a path delay of the selected memory module 530. As described above, the path delay defines a delay for enabling the DQS receiver gate 514 following issuance of a read command. Once set, the path delay prevents the memory controller from capturing unintended bit values when the DQS signal is not being driven by the memory module 530. This path delay is calculated using the path delay equation (2) described above. In essence, this process is repeated for each memory channel 520 coupled to the memory controller 510 and is repeated for each memory module 530 coupled to each memory channel 520.

In addition, the values selected for M-word burst pattern and the N-word burst pattern can be manipulated to account for strobe variation due to simultaneous switching output (SSO) push out that can occur in a real time system. In addition, the reading and writing from the selected memory module 530, to calculate the boundary memory locations, is generally repeated for each control setting to average in the effects jitter in the memory controller clock, memory module phase locked loops (PLL) and the memory modules delay locked loops.

As described above, the detection of the boundary memory location is performed by moving the receive enabled control or path delay in a window manner to find the optimal receiver-enable delay or path delay. This process begins by writing a known pattern consisting of a burst of two of non-zero values followed by a burst of two zero data values into consecutive memory locations for each memory module. The data is then read back with the receiver enable timing advanced until the first two words read from the burst data of our data values goes from non-zero to zero. In one embodiment, the boundary detection circuit 560 takes 16 readings for each control setting to average in the effects of jitter, as described above. By detecting the time that the data switches from non-zero to zero, the path delay to correctly capture data can be calculated. By using a smaller capture window (two words) compared to the bursts received from the memory (four words), the calibration logic avoids unwanted values on DQ/DQS 536/538.

Several aspects of one implementation of a memory controller for providing control calibration of multiple memory module memory channels have been described. However, various implementations of the memory controller provide numerous features including, complementing, supplementing, and/or replacing the features described above. Features can be implemented as part of a chipset or as part of a memory controller hub in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a memory controller, it will be appreciated by those skilled in the art that the teaching of the present invention can be applied to other systems. In fact, systems for double data rate device are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

Having disclosed exemplary embodiments, modifications and variations may be made to the disclosed embodiments while remaining within the scope of the invention as defined by the following claims.

What is claimed is:

1. A method comprising:

selecting a memory channel from one or more memory channels coupled to a controller;

selecting a memory module from one or more memory modules coupled to the selected memory channel;

determining a path delay for the selected memory module, the path delay including a time interval for receipt of a source synchronous data strobe signal and requested data contained within a source synchronous data signal from the selected memory module following issuance of a command by the controller to the selected memory module for the requested data;

storing the path delay, such that when the controller issues a command to the selected memory module, a controller receiver is enabled to capture the requested data within the data signal according to the data strobe signal following a time interval defined by the path delay from issuance of the command;

repeating the selecting memory module and the determining the path delay for each memory modules coupled to the selected memory channel; and repeating the selecting, the selecting, the determining and the repeating for each memory channel coupled to the controller.

2. The method of claim 1, wherein the determining the path delay for the selected memory module further comprises:

writing an M-word burst pattern to the selected memory module;

writing an N-word burst pattern in a consecutive memory location to the M-word burst pattern in the selected memory module;

detecting a boundary memory location between the M-word burst pattern and the N-word burst pattern in the selected memory module;

determining a receiver-enable delay for capturing the boundary memory location, such that the receiver-enable delay includes the time elapsed between issuance of a read command until a time for enabling the controller receiver to capture a first bit value and a second bit value defining the boundary memory location; and utilizing the receiver-enable delay to calculate the path delay of the selected memory module.

3. The method of claim 2, wherein the detecting the boundary memory location further comprises:

selecting a variable time interval equal to an initial predetermined time interval of the selected memory channel;

issuing a read command to the selected memory module to read a first bit value and a second bit value in a data signal from the selected memory module;

enabling the memory controller receiver after the variable time interval from issuance of the read command in order to capture the first and second bit values in the data signal from the selected memory module;

when the captured first bit value and the second bit value are from the M-word burst pattern, increasing variable time interval by a predetermined amount;

repeating the issuing, the enabling and the increasing until the first bit value and the second bit value captured by the controller receiver define the boundary memory location between the M-word burst pattern and the N-word burst pattern, such that a final value of the variable time interval is used as a receiver-enable delay.

4. The method of claim 3, further comprising:

transmitting a reference pulse from the controller to a first memory module coupled to the selected memory channel and back to the memory controller, and measuring a value that includes a roundtrip flight time interval of the pulse, wherein the initial predetermined time interval for the selected memory channel is at least as long as the roundtrip time interval.

5. The method of claim 4 wherein the initial predetermined time interval is at least as long as the roundtrip time interval plus a memory read latency interval of the first memory module.

6. The method of claim 5, wherein the utilizing the receiver-enabled delay to calculate the memory module path delay further comprises:

selecting the path delay of the selected memory module equal to the final value of the variable time interval less the initial predetermined time interval for the selected memory channel plus the memory read latency of the selected memory module less a memory clock cycle minus one less a read latency of the selected memory module multiplied by a control granularity value.

7. The method of claim 1, wherein the selecting the memory channel further comprises:

transmitting a reference pulse from the controller to a first memory module coupled to the selected memory channel and back to the controller, and measuring a value that includes a roundtrip flight time interval of the pulse, wherein an initial value of a variable time interval for the selected memory channel is at least as long as the roundtrip time interval plus a memory read latency of the first memory module.

8. The method of claim 3, further comprising:

when the selected memory module is a dual sided memory module, such that the final value of the variable time interval was determined for a first side of the selected memory module, repeating the issuing, the enabling, the increasing and the repeating, to determine a final value of the variable time for a second side of the selected memory; and selecting the receiver-enable delay for the selected memory module as a greater of the final value of the variable time interval determined for the first side of the selected memory module and the final value of the variable time interval determined for the second side of the selected memory module.

9. An apparatus comprising:

a controller having one or more memory channels coupled to the controller, wherein each memory channel includes one or more memory modules coupled to the respective memory channel, including:

a receiver means, enabled according to a receiver enable signal, for capturing requested data in a source synchronous data signal according to a source synchronous data strobe signal from a selected memory module; and a path delay means for retrieving a stored path delay of the selected memory module, the path delay defining a time interval for receipt of data following issuance of a command to the selected memory module, such that when the controller issues a command to the selected memory module, the delay means generates the receiver enable signal, following a time interval as defined by the path delay from issuance of the command, to enable the receiver means to capture the requested data within the data signal from the selected memory module according to the data strobe signal.

10. The apparatus of claim 9, further comprising:

a path delay measurement means for determining a path delay for each memory module of each memory channel coupled to the controller and store each path delay determined by the path delay measurement means, such that when the controller issues a read command to a selected memory module, the path delay, means selects a stored path delay of the selected memory module in order to enable the receiver means, following a time interval as defined by the path delay from issuance of the command, to capture the requested data in a data signal requested by the read command issued to the selected memory module.

11. The apparatus of claim 10, wherein the delay path measurement means further comprises:

a boundary detection means for writing an M-word burst pattern and an N-word burst pattern into consecutive memory locations of a selected memory module, and for selectively capturing bit values from the selected memory module beginning with a first bit value of the M-word burst pattern, the boundary detection means for enabling the receiver, following a variable time interval from issuance of a read command, which is increased until a boundary memory location between the M-word burst and the N-word burst pattern is detected by capturing a first bit value of the N-word burst pattern, such that a final value of the variable time interval is used to calculate the path delay of the selected memory module.

12. The apparatus of claim 11, wherein the delay path measurement means further comprises:

a time interval measurement means for determining a value representative of a roundtrip flight time interval of a reference pulse sent from the controller to a first memory module coupled to the memory channel containing the selected memory module and back to the controller, the time interval measurement means being further coupled to the delay circuit so that an initial value of the variable time interval is at least as long as the roundtrip flight time interval.

13. The apparatus of claim 7, wherein the predetermined time interval is at least as long as the roundtrip time interval plus a memory read latency interval of the selected memory module, such that the path delay measurement circuit selects the path delay of the selected memory module equal to the final value of the variable time interval less the initial value of the variable time interval plus the memory read latency of the selected memory module less a memory clock cycle minus one less a read latency of the selected memory module multiplied by a control granularity value.

14. The apparatus of claim 7, further comprising:

an edge detecting means for disabling the controller receiver when a next operation is a non-read command.

15. A controller comprising:

one or more memory channels coupled to the controller, wherein each memory channel includes one or more memory modules coupled to the respective memory channel;

a controller receiver, enabled according to a receiver enable signal, to capture requested data in a source synchronous data signal according to a source synchronous data strobe signal from a selected memory module; and a delay circuit to retrieve a stored path delay of the selected memory module, the path delay defining a time interval for receipt of data following issuance of a command to the selected memory module, such that when the controller issues a command to the selected memory module, the delay circuit generates the receiver enable signal, following a time interval as defined by the path delay from issuance of the command, to enable the controller receiver to capture the requested data from the selected memory module according to the data strobe signal.

16. The controller of claim 15, further comprising:

a path delay measurement circuit coupled to determine a path delay for each memory module of each memory channel coupled to the controller and store each path delay determined by the path delay measurement circuit, such that when the controller issues a read command to a selected memory module, the delay circuit selects a stored path delay of the selected memory module in order to enable the controller receiver, following a time interval as defined by the path delay from issuance of the command, to capture data in a data signal requested by the read command issued to the selected memory module.

17. The controller of claim 16, wherein the path delay measurement circuit further comprises:

a boundary detection circuit coupled to write an M-word burst pattern and an N-word burst pattern into consecutive memory locations of a selected memory module, and to selectively capture bit values from the selected memory module beginning with a first bit value of the M-word burst pattern, the boundary detection circuit enabling the controller receiver, following a variable time interval from issuance of a read command, which is increased until a boundary memory location between the M-word burst and the N-word burst pattern is detected by capturing a first bit value of the N-word burst pattern, such that a final value of the variable time interval is used to calculate the path delay of the selected memory module.

18. The controller of claim 17, wherein the path delay measurement circuit further comprises:

a time interval measurement circuit coupled to determine a value representative of a roundtrip flight time interval of a reference pulse sent from the controller to a first memory module coupled to the memory channel containing the selected memory module and back to the controller, the time interval measurement circuit being further coupled to the delay circuit so that an initial value of the variable time interval is at least as long as the roundtrip flight time interval.

19. The controller of claim 18 wherein the predetermined time interval is at least as long as the roundtrip time interval plus a memory read latency interval of the selected memory module, such that the path delay measurement circuit selects the path delay of the selected memory module equal to the final value of the variable time interval less the initial value of the variable time interval plus the memory read latency of the selected memory module less a memory clock cycle minus one less a read latency of the selected memory module multiplied by a control granularity value.

20. The controller of claim 15, further comprising:

an edge detector having an input coupled to an output of the delay circuit and an output coupled to a control input of the controller receiver to disable the controller receiver when a next operation is a non-read command.

21. A system comprising:

a processor;

a memory controller coupled to the processor, via a front side bus, which enables communication between the processor and one or more memory channels coupled to the controller, wherein each memory channel includes one or more memory modules coupled to a respective memory channel, the memory controller including a controller receiver, enabled according to a receiver enable signal, to capture requested data within a source synchronous data signal according to a source synchronous data strobe signal from a selected memory module; and a delay circuit to retrieve a stored path delay of a selected memory module, the path delay defining a time interval for receipt of data following issuance of a command to the selected memory module, such that when the memory controller issues a command to the selected memory module, the delay circuit generates the receiver enable signal, following a time interval as defined by the path delay from issuance of the command, to enable the controller receiver to capture the requested data from the selected memory module according to the data strobe signal.

22. The system of claim 21, wherein the memory controller further comprises:

a path delay measurement circuit coupled to determine a path delay for each memory module of each memory channel coupled to the controller and store each path delay determined by the path delay measurement circuit, such that when the controller issues a read command to a selected memory module, the delay circuit selects a stored path delay of the selected memory module in order to enable the controller receiver, following a time interval as defined by the memory module path delay from issuance of the command, to capture data in a data signal requested by the read command issued to the selected memory module.

23. The system of claim 22, wherein the memory module path delay measurement circuit further comprising:

a boundary detection circuit coupled to write an M-word burst pattern and an N-word burst pattern into consecutive memory locations of a selected memory module, and to selectively capture bit values from the selected memory module beginning with a first bit value of the M-word burst pattern, the boundary detection circuit enabling the controller receiver, following a variable time interval variable from issuance of a read command, which is increased until a boundary memory location between the M-word burst and the N-word burst pattern is detected by capturing a first bit value of the M-word burst pattern, such that a final value of the variable time interval is used to calculate the path delay of the selected memory module.

24. The system of claim 23 wherein the path delay measurement circuit further comprises:

a time interval measurement circuit coupled to determine a value representative of a roundtrip flight time interval of a reference pulse sent from the controller to a first memory module coupled to the memory channel containing the selected memory module and back to the controller, the time interval measurement circuit being further coupled to the delay circuit so that an initial value of the variable time interval is at least as long as the roundtrip flight time interval.

25. The system of claim 24, wherein the predetermined time interval is at least as long as the roundtrip time interval plus a memory read latency interval of the selected memory module such that the path delay measurement circuit selects the path delay of the selected memory module equal to the final value of the variable time interval less the initial value of the variable time interval plus the memory read latency of the selected memory module less a memory clock cycle minus one less a read latency of the selected memory module multiplied by a control granularity value.

26. The system of claim 25, further comprising:

an integrated circuit package containing a die in which the processor and a system chipset including the memory controller are built.

27. The system of claim 21, wherein the memory controller further comprises:

an edge detector having an input coupled to an output of the delay circuit and an output coupled to a control input of the controller receiver to disable the controller receiver when a next operation is a non-read command.

* * * * *